(12) United States Patent
Zhou et al.

(10) Patent No.: US 8,949,381 B1
(45) Date of Patent: Feb. 3, 2015

(54) NETWORK SERVICE PROVISIONING

(75) Inventors: Eileen Zhou, San Jose, CA (US); Roger Liu, San Jose, CA (US); Vijoi Choyi, Santa Clara, CA (US); Moshe Itah, Palo Alto, CA (US); John Z. Yu, Santa Clara, CA (US)

(73) Assignee: Brixham Solutions Ltd., Tortola (VG)

( * ) Notice: Subject to any disclaimer, the term of this patent is extended or adjusted under 35 U.S.C. 154(b) by 1345 days.

(21) Appl. No.: 10/749,922

(22) Filed: Dec. 31, 2003

(51) Int. Cl.
  *G06F 15/177* (2006.01)
(52) U.S. Cl.
  USPC ........... 709/220; 709/223; 709/225; 709/226; 709/227; 709/228; 709/229
(58) Field of Classification Search
  USPC .......... 709/220, 223, 225, 226, 227, 228, 229
  See application file for complete search history.

(56) References Cited

U.S. PATENT DOCUMENTS

| | | | | |
|---|---|---|---|---|
| 5,453,979 A | * | 9/1995 | Schibler et al. | 370/395.32 |
| 5,959,985 A | * | 9/1999 | Freen et al. | 370/351 |
| 6,067,299 A | * | 5/2000 | DuRee | 370/397 |
| 6,343,083 B1 | * | 1/2002 | Mendelson et al. | 370/466 |
| 6,597,689 B1 | * | 7/2003 | Chiu et al. | 370/354 |
| 6,625,648 B1 | * | 9/2003 | Schwaller et al. | 709/224 |
| 6,757,247 B1 | * | 6/2004 | Zheng et al. | 370/231 |
| 6,760,343 B1 | * | 7/2004 | Krishnamurthy et al. | 370/466 |
| 6,865,156 B2 | * | 3/2005 | Horioka et al. | 370/236.1 |
| 7,239,636 B2 | * | 7/2007 | Kadambi et al. | 370/395.2 |

\* cited by examiner

*Primary Examiner* — Rupal Dharia
*Assistant Examiner* — Van Kim T Nguyen
(74) *Attorney, Agent, or Firm* — Amin, Turocy & Watson, LLP (57) ABSTRACT

A technique for creating a connection is disclosed. The technique includes receiving instructions to set a first endpoint, receiving instructions to set a second endpoint, receiving instructions to set a connection between the first and second endpoints, and transferring the instructions to set the two endpoints and the connection to network elements associated with the two endpoints after receiving the instructions to set the connection. A technique for retrieving a connection endpoint index from a connection table is also disclosed. The technique includes reading a common index column element, wherein the common index column contains indexes corresponding to a plurality of service types, and interpreting the index column element based on an interface index that identifies the service type.

15 Claims, 7 Drawing Sheets

Connection creation flow according to another service provisioning method

FIG. 1: Network service provisioning overview

FR Endpoint Table

| Node ID (Integer) | I/F Index (integer) | DLCI (Integer) |
|---|---|---|
| 1 | 1 | DLCI1 |
| 1 | 1 | DLCI2 |

220

ATM Endpoint Table

| Node ID (Integer) | I/F Index (integer) | VPI (Integer) | VCI (Integer) |
|---|---|---|---|
| 1 | 2 | VPI1 | VCI1 |
| 1 | 2 | VPI2 | VCI2 |

221

Ethernet Endpoint Table

| Node ID (Integer) | I/F Index (integer) | VLAN ID (Integer) |
|---|---|---|
| 2 | 1 | VLAN1 |
| 2 | 1 | VLAN2 |

222

FR to ATM Connection Table

| Connection Index | Node ID (Integer) | I/F Index (integer) | DLCI (Integer) | Node ID (Integer) | I/F Index (integer) | VPI (Integer) | VCI (Integer) |
|---|---|---|---|---|---|---|---|
| 1 | 1 | 1 | DLCI1 | 1 | 2 | VPI1 | VPI1 |

225

FR to Ethernet Connection Table

| Connection Index | Node ID (Integer) | I/F Index (integer) | DLCI (Integer) | Node ID (Integer) | I/F Index (integer) | VLAN ID (Integer) |
|---|---|---|---|---|---|---|
| 2 | 1 | 1 | DLCI2 | 2 | 1 | VLAN1 |

226

ATM to Ethernet Connection Table

| Connection Index | Node ID (Integer) | I/F Index (integer) | VPI (Integer) | VCI (Integer) | Node ID (Integer) | I/F Index (integer) | VLAN ID (Integer) |
|---|---|---|---|---|---|---|---|
| 3 | 1 | 2 | VPI2 | VCI2 | 2 | 1 | VLAN2 |

227

FIG. 2A: MIB tables: service endpoint tables & multiple connection tables

FR Endpoint Table

| Node ID (Integer) | I/F Index (integer) | DLCI (Integer) |
|---|---|---|
| 1 | 1 | DLCI1 |
| 1 | 1 | DLCI2 |

240

ATM Endpoint Table

| Node ID (Integer) | I/F Index (integer) | VPI (Integer) | VCI (Integer) |
|---|---|---|---|
| 1 | 2 | VPI1 | VCI1 |
| 1 | 2 | VPI2 | VCI2 |

241

Ethernet Endpoint Table

| Node ID (Integer) | I/F Index (integer) | VLAN ID (Integer) |
|---|---|---|
| 2 | 1 | VLAN1 |
| 2 | 1 | VLAN2 |

242

Connection Table

| Connection Index | Node ID (Integer) | I/F Index (integer) | DLCI (Integer) | VPI (Integer) | VCI (Integer) | VLAN ID (Integer) | Node ID (Integer) | I/F Index (integer) | DLCI (Integer) | VPI (Integer) | VCI (Integer) | VLAN ID (Integer) |
|---|---|---|---|---|---|---|---|---|---|---|---|---|
| 1 | 1 | 1 | DLCI1 | | | | 1 | 2 | | VPI1 | VCI1 | |
| 2 | 1 | 1 | DLCI2 | | | | 2 | 1 | | | | VLAN1 |
| 3 | 1 | 2 | | VPI2 | VCI2 | | 2 | 1 | | | | VLAN2 |

245

FIG. 2B: MIB tables: service endpoint tables & single connection table

FIG. 3A: Connection creation flow according to one service provisioning method

FIG. 3B: Connection deletion flow according to one service provisioning method

FIG. 4: "Mega"-table setup

FIG. 5: Connection creation flow according to another service provisioning method

NETWORK SERVICE PROVISIONING

FIELD OF THE INVENTION

The present invention relates generally to communication networks. More specifically, a technique for network service provisioning is disclosed.

BACKGROUND OF THE INVENTION

Network management systems (NMS) facilitate the exchange of management information between network elements. An NMS can be used to provision service connections between network elements. There are a number of issues with existing service provisioning techniques, particularly when managing growing networks. For example, tables used for service provisioning are maintained at the NMS and network element level. The structures of these tables generally need to be modified each time a new service type is introduced into the network. Another problem is that existing systems may be susceptible to dangling service endpoints or connections, which can build up over the long term and bog down the network. Also undesirable is the fact that most service provisioning systems require a carrier's operation support system (OSS) to be responsible for handling failed transactions, such as a failed creation of a connection in a network element. It would be desirable to develop a more efficient, reliable, and scalable service provisioning mechanism capable of managing large scale networks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A service provisioning technique is disclosed herein. In some embodiments, provisioning a connection includes receiving instructions at a network management system to set endpoints and a connection before transferring the instructions to the associated endpoints. Deleting the connection includes determining at the NMS that the connection is to be deleted, deleting the connection and endpoints on the NMS, and then transferring the instructions to the associated endpoints. In some embodiments, a connection table includes a common index column to facilitate the addition of new services.

Figure 1:
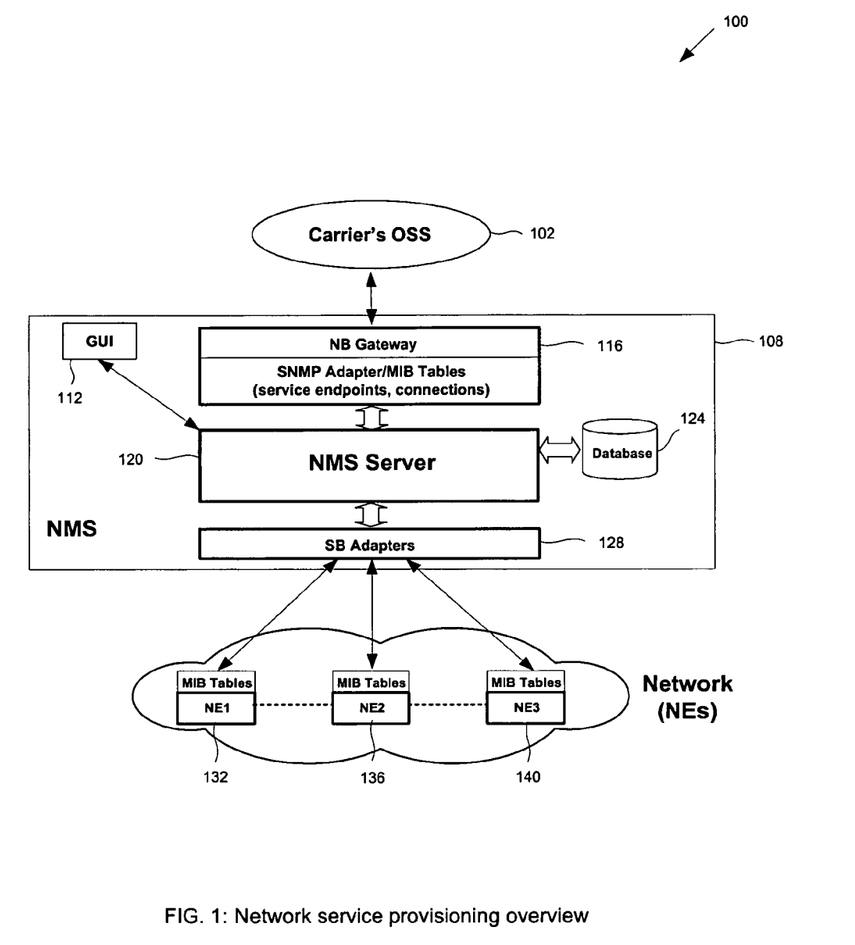
FIG. 1 is a block diagram illustrating an overview of network service provisioning.

FIG. 1 is a block diagram illustrating an overview of network service provisioning. The network 100 includes a carrier's operation support system (OSS) 102, a network management system (NMS) 108, and a network including network equipment (NE) 132, 136, and 140. An OSS includes a system a carrier (service provider) uses to operate, control, and manage a network for service deployment. An NMS includes a system responsible for managing a network, and facilitates the communication between a carrier's OSS and NEs in the network. A carrier may operate an OSS over the NMS to manage the network to provide services to customers. NMS 108 includes NB gateway/adapters 116, graphical user interface (GUI) 112, and NMS server 120. For example, NB adapters 116 are shown to include an SNMP adapter. However, other adapters can be included, such as an XML adapter, a Corba adapter, or a TL1 adapter. GUI 112 and NB gateway 104 are connected to NMS server 132 as clients. NB gateway/adapters 116 process information to facilitate communication between NMS server 120 and OSS 102 using different types of protocols. SB adapters 128 process information to facilitate communication between the NMS server and NEs. In some embodiments, the NMS is described in U.S. patent application Ser. No. 10/742,573 by Zhou et. al. (filed Dec. 19, 2003) entitled: "Network Management System" which is herein incorporated by reference for all purposes.

An NE, as used herein, includes any device or node in the network, such as a network switch. An NE can include multiple physical/logic interfaces, in which service endpoints are defined. A service endpoint includes a service connection endpoint defined over a specific physical/logical interface in an NE. There may be different types of service endpoints, such as Frame Relay, ATM, or Ethernet, which specify different types of services provisioned over the NEs. A service connection may be defined between two service endpoints in one or two NEs. When the two service endpoints reside on two different (end) NEs, a service connection between the two service endpoints may traverse multiple (intermediate) NEs which connect the two (end) NEs. When the two service endpoints are on the same NE, a service connection may become a cross-connect over the NE. Thus, a service connection may be formed by a concatenation of one or more multiple cross-connects over a series of inter-connected NEs along the service connection path.

NMS server 120 includes a configuration manager responsible for service connection provisioning. In particular, it sets up special Management Information Base (MIB) tables in the SNMP adapter communicating with OSS, including service endpoints tables and connection tables in NMS and corresponding MIB tables in the NEs, to provision service connections (or virtual circuits) over the NEs for service deployment.

Figure 2A:
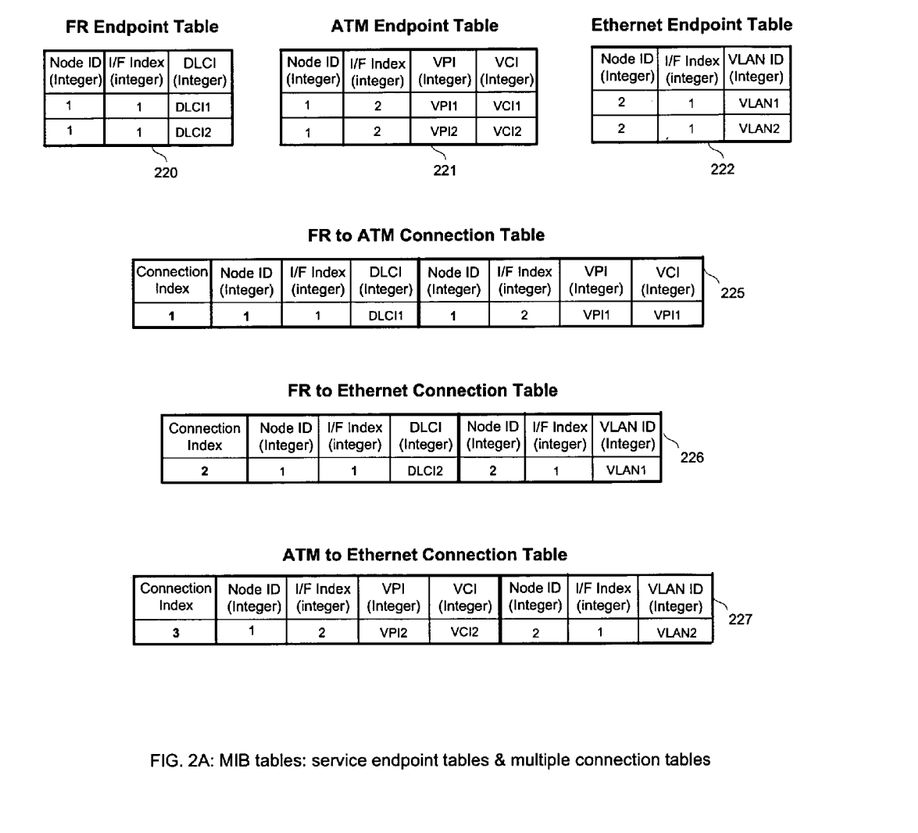
FIG. 2A illustrates examples of service endpoint MIB tables and connection tables in an NMS.

FIG. 2A illustrates examples of service endpoint MIB tables 220-222, and connection tables 225-227 in an NMS. Service endpoint tables and connection tables are maintained on an NMS, and on the traversed NE(s) along the service connection path (which are not shown). In this example, the NMS manages two NEs, node 1 and node 2 with Node ID 1 and Node ID 2, respectively. The physical/logical interfaces are determined by the I/F index which is an integer unique within an NE. The service endpoints are then determined by service specific identifiers, such as DLCI for a FR service endpoint, VPI and VCI for an ATM service endpoint, and VLAN ID for an Ethernet service endpoint. Each service endpoint is a row in a service endpoint table. A service endpoint table includes columns to specify service connection attributes. For example, service endpoint tables 220-222 are shown to include Node ID, I/F Index, and Identifier columns. Other columns, such as for traffic parameters, may also be included in service endpoint tables. FIG. 2A illustrates Frame Relay endpoint table 220, ATM endpoint table 221, and Ethernet endpoint table 222.

A service endpoint table typically includes all the service endpoints in an NE for each service type. As shown in service endpoint tables 220-222, a service endpoint includes columns to specify service connection attributes. The Node ID is an integer unique to the network to identify an NE. The I/F Index is an integer unique to an NE to identify a specific physical/logical interface. Because an I/F Index is unique to a node, it also can represent the type of interface, such as Frame Relay, ATM, or Ethernet. The identifier includes one or more integers unique to a physical/logical interface to identify a specific service connection. Depending on the service types, one or more such Index Numbers may be required. For example, one Index Number, DLCI or VLAN ID, identify a Frame Relay connection or an Ethernet connection, respectively. However, two Index Numbers, VPI and VCI, identify an ATM connection. Other parameters to specify service connection characteristics, such as class of service and traffic parameters, may also be included, but are not shown in FIG. 2A.

Connection tables 225-227 are shown for three different types of connections: FR-to-ATM, FR-to-Ethernet, and ATM-to-Ethernet. Other connection tables for the connections, such as FR-to-FR, ATM-to-ATM, Ethernet-to-Ethernet, etc., may also be included, but are not shown in FIG. 2A. A connection table includes service connections, each of which is defined by two service endpoints. In some embodiments, the connection table is a management information base (MIB) table. In a connection table, a row represents a connection. For each row, a first set of columns specifies one service endpoint of the connection, and a second set of columns specifies another service endpoint of the connection. An end-to-end connection includes a primary connection and a plurality of associated connections. For example, a primary connection between final endpoints A and B can include associated connections A to A', A' to B', and B' to B, wherein A' and B' are intermediate service endpoints through which the primary connection passes. A' and B' can be two service endpoints cross connected in an intermediate node. A connection table can include primary connections as well as connections (cross-connects) associated with primary connections. Hence, creating one (primary) connection requires adding one row in the connection table representing the connection, and possibly adding one or more rows in the connection table representing the cross-connects over the intermediate NEs that form the connection. Likewise, deleting one (primary) connection requires removing one row in the connection table representing the connection, and possibly removing one or more rows in the connection table representing the cross-connects over the intermediate NEs that form the connection.

Connection tables 225-227 include one FR-to-ATM connection, one FR-to-Ethernet connection, and one ATM-to-Ethernet connection, respectively. In some embodiments, connection tables 225-227 include virtual service endpoints, as further described in U.S. patent application Ser. No. 10/677,090. Note that only Node ID, I/F Index, and Common Index columns for each side of the connection are shown in connection tables. Connection tables 225-227 can include other columns with integers to specify service connection characteristics.

Note that the way connection tables are defined in FIG. 2A requires N*(N−1)/2 connection tables, where N is the number of service endpoint types. Therefore, N new connection tables are required to be added in the NMS whenever a new service is added in the network.

Figure 2B:
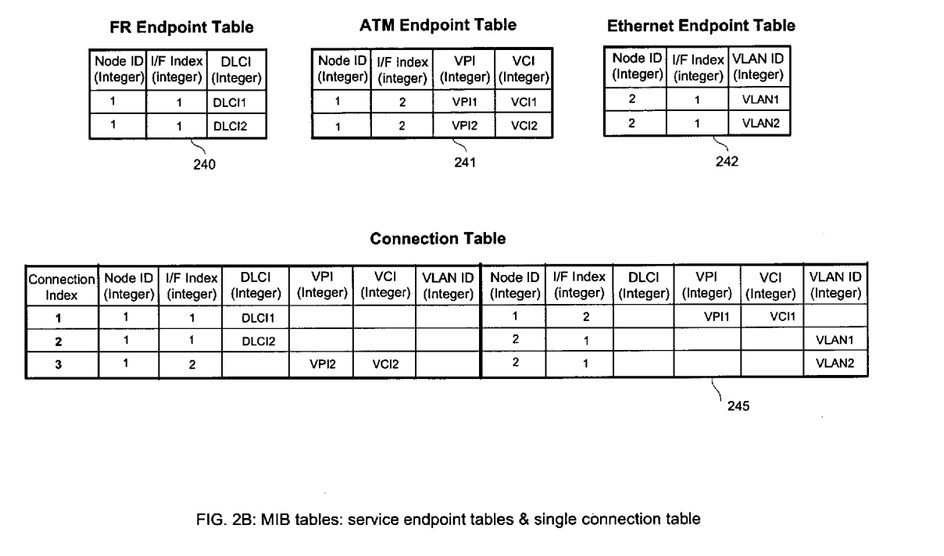
FIG. 2B illustrates examples of service endpoint MIB tables and another type of connection table in an NMS.

FIG. 2B illustrates examples of service endpoint MIB tables 240-242 (the same as 220-222 in FIG. 2A), and another type of connection table 245 in an NMS. Connection table 245 includes three different types of connections: one FR-to-ATM connection, one FR-to-Ethernet connection, and one ATM-to-Ethernet connection. The connection table is no longer service specific, but the number of columns specifying connection/cross-connect identifiers is the same as the number of service endpoint types in the first set of columns and the second set of columns. Some identifiers are not applicable to some type of service connection/cross-connect, which leaves some empty entries in the connection table. In some embodiments, connection table 245 includes a virtual service endpoint, as further described in U.S. patent application Ser. No. 10/677,090 which was previously incorporated by reference. Note that only Node ID, I/F Index, and Common Index columns for each side of the connection are shown in connection table 245. Connection table 245 typically includes other columns with integers to specify service connection characteristics.

Note that the way the connection table is defined in FIG. 2B requires adding two columns in the connection table when a new service is added to the network. Therefore, whenever a new service is introduced, the structure of the connection table in the NMS has to be re-constructed (augmented).

Service endpoint tables and connection tables on an NE are similar to those on an NMS. On an NE, the Node ID column can be eliminated because the node is known.

Figure 3A:
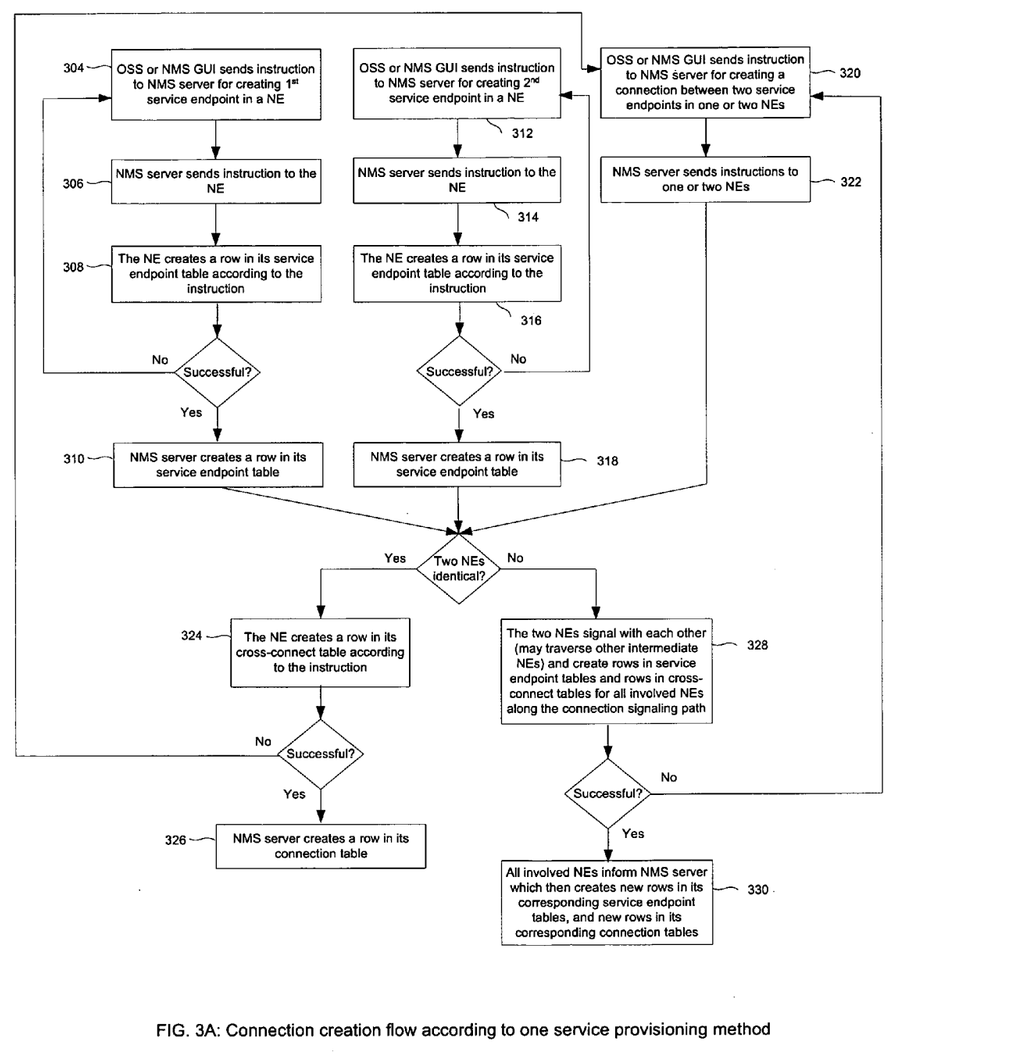
FIG. 3A is a flowchart illustrating a method of connection creation.

FIG. 3A is a flowchart illustrating a method of connection creation. The OSS or NMS GUI sends instruction to the NMS server for creating the first service endpoint in an NE (304). The NMS server passes the information to the destined NE (306), which then creates a row in its service endpoint table accordingly (308). If the operation in NE is successful, the NMS server creates a row in its service endpoint table (310); if not, the NE informs the OSS or NMS GUI to indicate an operation failure. Similarly the second service endpoint may be created in an NE which may be the same as or different from the previous NE (312, 314, 316) and the NMS server may create a row in its service endpoint table (318). The OSS or NMS GUI sends instruction to the NMS server for creating a connection between the two above-mentioned service endpoints (320). The NMS server passes the information to the NE(s) (322):

If the two service endpoints reside at the same NE, the NE creates a row in its cross-connect table (324). If this operation is successful, the NMS server creates a row in its connection table accordingly (326); if not, the NE informs the OSS or NMS GUI to indicate an operation failure.

If the two service endpoints reside on two different NEs, the two NEs signal with each other (the signaling path may traverse other intermediate NEs), to create corresponding service endpoints and cross-connects in their service endpoint table and cross-connect tables for all involved NEs (328). If this operation is successful, the NMS server creates new rows in its corresponding service endpoint tables, and new rows in its corresponding connection tables (330); if not, the NEs inform the OSS or NMS GUI to indicate the operation failure.

Note that in this connection creation method, the service endpoint creation commands are "passed through" the NMS server, and directly arrive at the NE(s). The service endpoint creations on the NEs and NMS (for the initial and terminating service endpoints) may be done regardless of whether the connection (or cross-connects) creation is successful or not. As a result, dangling service endpoints may exist in NEs which are not associated with any operational connections/cross-connects. Dangling service endpoints can cause significant network resource waste. Significant operational cost may be introduced to remove dangling service endpoints in the networks using specific network management procedures.

Figure 3B:
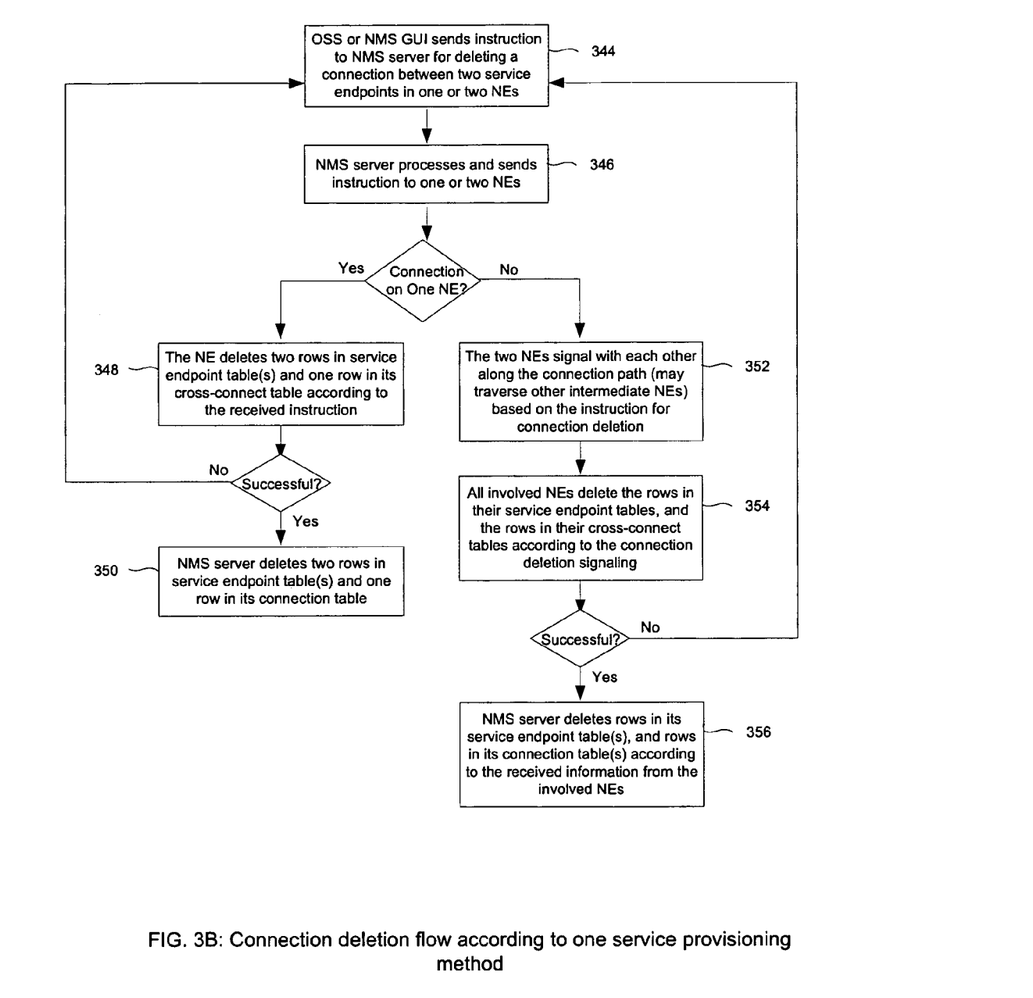
FIG. 3B is a flowchart illustrating a method of connection deletion.

FIG. 3B is a flowchart illustrating a method of connection deletion. The OSS or NMS GUI sends instructions to the NMS server for deleting a connection between two service endpoints which may reside on one or two NEs (344). The NMS server processes the information and sends it to the NE(s) (346):

If the two service endpoints reside at the same NE, the NE deletes the corresponding two rows in its service endpoint table(s), and one row in its cross-connect table (348). If this operation is successful, the NMS server deletes two rows in its service endpoint table(s), and one row in its connection table (350); if not, the NE informs the OSS or NMS GUI to indicate an operation failure.

If the two service endpoints reside on two different NEs, the two NEs signal with each other along the connection path (may traverse other intermediate NEs) (352), and all involved NEs then delete corresponding rows in their service endpoint tables, and rows in their cross-connect tables (354). If this operation is successful, the NMS server deletes rows in its corresponding service endpoint tables, and rows in its corresponding connection tables (356); if not, the NEs inform the OSS or NMS GUI to indicate an operation failure.

In some embodiments, the transferring of instructions to NEs occurs after deleting the connection and the endpoints at the NMS.

Figure 4:
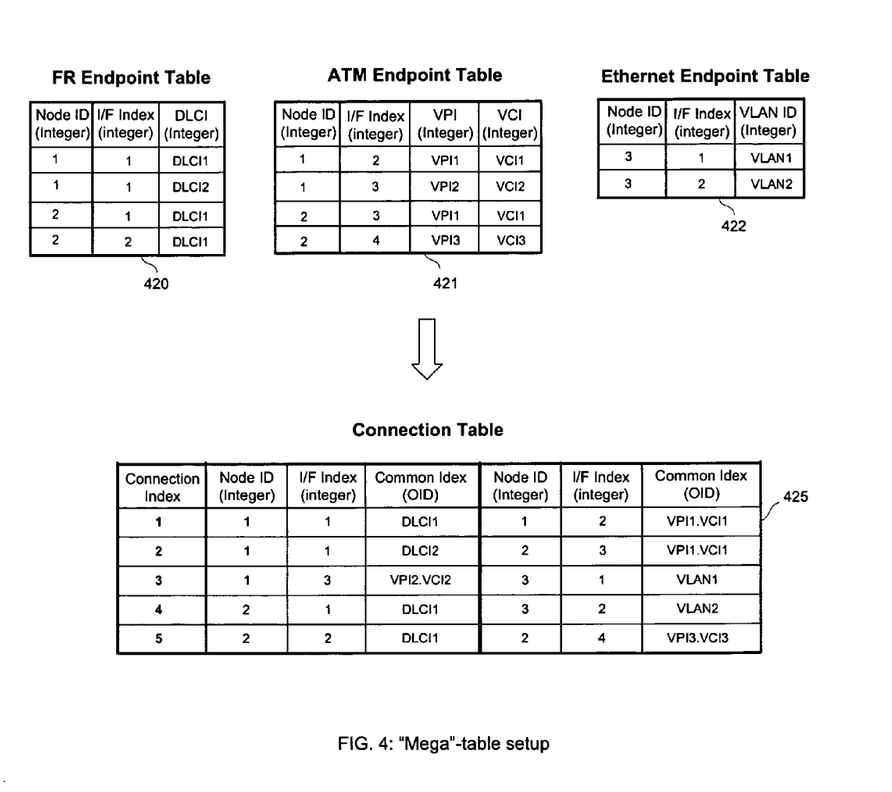
FIG. 4 is a flowchart illustrating another example of MIB tables in an NMS.

FIG. 4 is a flowchart illustrating another example of MIB tables in an NMS. The examples shown in FIG. 4 include service endpoint tables 420-422 and a connection table 425. Specifically, all service endpoint indexes in connection table 425 can be represented by a Common Index field, which contains indexes corresponding to a plurality of types of services. In some embodiments, the content of the Common Index column is the object identifiers (OID) of a service endpoint index. For example, in connection table 425, the Common Index for an FR service endpoint is "DLCI", the Common Index for an ATM service endpoint is "VPI.VCI", and the Common Index for an Ethernet service endpoint is "VLAN".

Because one index column for each endpoint can be used to include all types of endpoints, the connection table structure does not need to be augmented when new service endpoint types are introduced. Adding new services becomes much easier from an NMS service provisioning perspective. This provides great NMS scalability for new service introduction. For example, if connections between FR and ATM endpoints are currently supported, later adding Ethernet endpoints would not require restructuring the MIB table.

Furthermore, the MIB tables can be designed in such a way that service endpoint tables 420-422 and connection table 425 are coupled together to be viewed as a so-called "mega" table. Specifically, since service provisioning includes configuring service endpoints and service connections at the NMS level and at the NE level, the creation of service endpoints and connections are coupled with each other. But the operations in the NMS and NEs can be decoupled with each other: one OSS/NMS operation does not necessarily trigger an NE operation. The OSS/NMS commands are not necessarily "passed through" to NEs command by command, and the service endpoint tables and connection tables in NMS can be managed in a more integrated and efficient way.

Figure 5:
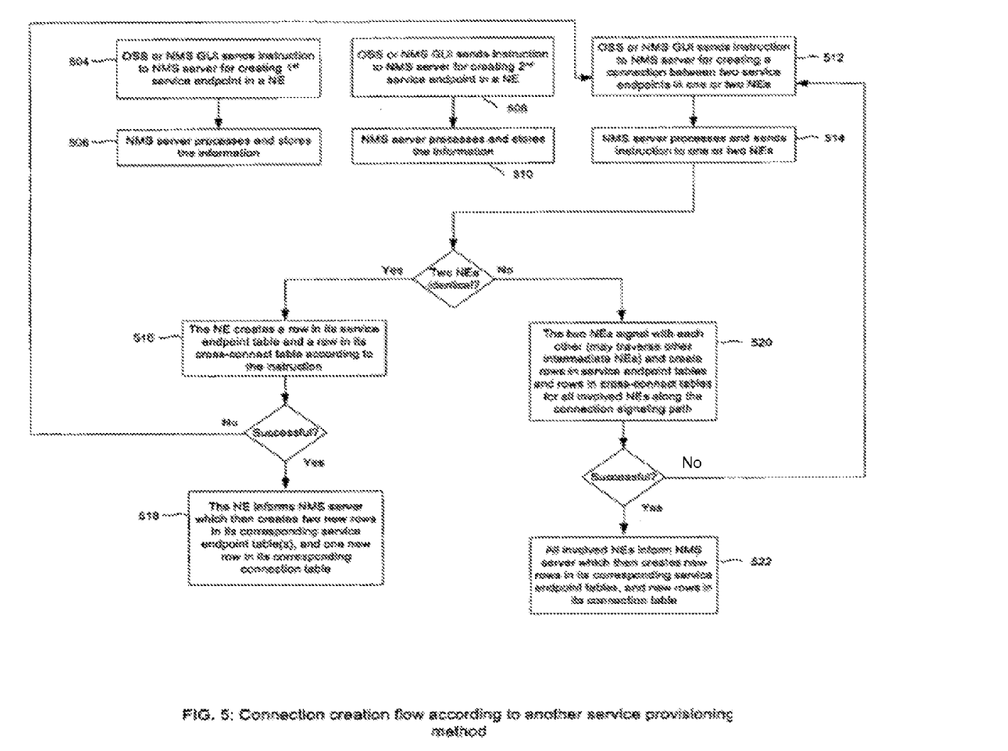
FIG. 5 is a flowchart illustrating another method of connection creation.

FIG. 5 is a flowchart illustrating another method of connection creation. When the OSS or NMS GUI sends instruction to the NMS server for creating the first service endpoint in an NE (504), the NMS server stores the information without necessarily immediately passing it to the destined NE (506), and service endpoints are not required to be created in service endpoint tables in either the NMS or NE at this point. Similarly, when the OSS or NMS GUI sends instructions to the NMS server for creating the second service endpoint in an NE (508), the NMS server stores the information without necessarily immediately passing it to the destined NE (510), and again service endpoints are not required to be created in service endpoint tables in either the NMS or NE at this point. Once the OSS or NMS GUI sends instruction to NMS server for creating a connection between the two above-mentioned service endpoints (512), the NMS server processes the information and sends it to the NE(s) (514):

If the two service endpoints reside at the same NE, the NE creates a row in its cross-connect table (516). If this operation is successful, the NMS server creates two new rows in its corresponding service endpoint table(s), and one new row in its connection table (518); if not, the NE informs the OSS or NMS GUI to indicate the operation failure.

If the two service endpoints reside on two different NEs, the two NEs signal with each other (the signaling path may traverse other intermediate NEs), to create corresponding service endpoints (including two initial and terminating service endpoints) and cross-connects in their service endpoint table and cross-connect tables for all involved NEs (520). If this operation is successful, the NMS server creates new rows in its corresponding service endpoint tables, and new rows in its corresponding connection tables (522); if not, the NEs inform the OSS or NMS GUI to indicate the operation failure.

Note that in this connection creation method, the operation for service endpoint creation and connection (or cross-connect) creation is integrated with each other at both the NMS and NE levels. Service endpoints are created in the NMS or NE when the corresponding cross-connect/connection creation is performed successfully. Before all the information that is needed to create an end-to-end connection is received by the NMS server, no SNMP operations are required to be propagated to the NE. The occurrence of dangling service endpoints or dangling connections in NE connection/cross-connect tables can thus be significantly minimized.

The connection deletion flow using this service provisioning method may be similar to the connection deletion flow shown in FIG. 3B.

In this method, service endpoint tables and the connection table are tied together conceptually into an integrated "mega" table. For example, no new service endpoint rows in NMS are created until all cross-connects in the underlying NEs are created successfully, and hence, both new service endpoint creation and new connection/cross-connect creation in NMS are made simultaneously. Furthermore, the connection creation is treated as one atomic operation. Accordingly, a carrier's OSS does not need to handle transactions related failed cases. For example, if the creation of a service endpoint in an NE is successful, but the creation of a connection in an NE fails, all associated service endpoints are automatically removed.

The connection table for an end-to-end connection and the connection tables for cross connects in intermediate NEs along the path of the connection can also be conceptually combined to form a "mega" table. Operations (e.g., connection creation and connection deletion) for cross connects on intermediate NEs and end-to-end connections are completely synchronized automatically without compromising network operation efficiency and resource efficiency.

The following are some benefits of this method for service provisioning:

One connection table can accommodate different types of connections such that no table structure change is needed when a new service type is added to the network. In contrast, other methods may either require multiple connection tables based on the connection types, or require connection table structure change, in order to introduce a new service type into the network Service endpoints are created in the NMS or NE when the corresponding cross-connect/connection creation is performed successfully. The occurrence of dangling service endpoints or dangling connections in NE connection/cross-connect tables can be significantly minimized. Conceptually, the service endpoint tables and connection table can be combined into an integrated "mega" table. Furthermore, because the SNMP messages from the NMS server to NEs across the network are synthesized and reduced, service provisioning is more reliable and efficient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by a network management server device comprising at least one processor, a first instruction to set a first service endpoint;
   receiving, by the network management server device, a second instruction to set a second service endpoint;
   receiving, by the network management server device, a third instruction to set a connection between the first service endpoint and the second service endpoint;
   transferring, by the network management server device, the first instruction, the second instruction, and the third instruction to one or more network element devices associated with the connection between the first service endpoint and the second service endpoint;
   setting, by the network management server device, the connection between the first service endpoint and the second service endpoint;
   in response to determining that the first service endpoint and the second service endpoint reside on a same network element device of the one or more network element devices:
      adding a first row to a cross-connect data structure associated with the same network element device,
      in response to determining that the adding the first row is successful, adding two second rows to a service endpoint data structure associated with the network management server device and a third row in a connection data structure associated with the network management server device, and
      in response to determining that the adding the first row is not successful, generating a first failure notification; and
   in response to determining that the first service endpoint and the second service endpoint respectively reside on a first network element device and a second network element device of the one or more network element devices, wherein the first network element device and the second network element device are different:
      sending an instruction to the first network element device and the second network element device to create the first service endpoint and the second service endpoint, respectively,
      adding one or more fourth rows to service endpoint data structures respectively associated with the first network element device and the second network element device, wherein the one or more fourth rows correspond to respective one or more cross-connections to one or more intermediate devices between the first network element device and the second network element device,
      adding one or more fifth rows to cross-connect data structures respectively associated with the first network element device and the second network element device, wherein the one or more fifth rows correspond to the respective one or more cross-connections,
      in response to determining that the adding the one or more fourth rows and the adding the one or more fifth rows is successful, adding a sixth row to the connection data structure associated with the network management server device, and
      in response to determining that the adding the one or more fourth rows and the creating the one or more fifth rows is not successful, generating a second failure notification.

2. The method of claim 1, wherein the connection is a primary connection.

3. The method of claim 2, further comprising setting another connection in response to determining that the other connection is associated with the primary connection.

4. The method of claim 1, wherein the third row comprises a first common index field containing a first object identifier of a first type of service associated with the first service endpoint and a second common index field containing a second object identifier of a second type of service associated with the second service endpoint, and wherein the first type of service is different than the second type of service.

5. The method of claim 4, wherein the first type of service and the second type of service respectively comprise one of an asynchronous transfer mode (ATM) service, a Frame Relay service, or an Ethernet service.

6. A method, comprising:

determining, by a network management server device comprising at least one processor, that a connection is to be deleted;

determining, by the network management server device, one or more network element devices associated with the connection;

determining, by the network management server device, a first service endpoint and a second service endpoint associated with the connection;

deleting the connection by the network management server device, wherein the deleting the connection comprises:

in response to determining that the first service endpoint and the second service endpoint reside on a same network element device of the one or more network element devices:

removing a first row of a cross-connect data structure associated with the same network element device, in response to determining that the removing is successful, removing two second rows of a service endpoint data structure associated with the network management server device and a third row of a connection data associated with the network management server device, and in response to determining that the removing is not successful, generating a first failure notification; and in response to determining that the first service endpoint and the second service endpoint respectively reside on a first network element device and a second network element device of the one or more network element devices, wherein the first network element device and the second network element device are different, sending an instruction to the first network element device and the second network element device to delete the first service endpoint and the second service endpoint, respectively, removing one or more fourth rows of service endpoint data structures respectively associated with the first network element device and the second network element device, wherein the one or more fourth rows correspond to respective one or more cross-connections to one or more intermediate devices between the first network element device and the second network element device, removing one or more fifth rows of cross-connect data structures respectively associated with the first network element device and the second network element device, wherein the one or more fifth rows correspond to the respective one or more cross-connections, in response to determining that the removing the one or more fourth rows and the removing the one or more fifth rows is successful, removing a sixth row of the connection data structure associated with the network management server device, and in response to determining that the removing the one or more fourth rows and the removing the one or more fifth rows is not successful, generating a second failure notification.

7. The method of claim 6, wherein the connection is a primary connection.

8. The method of claim 7, further comprising:
determining another connection associated with the primary connection; and
deleting the other connection in response to the determining the other connection.

9. The method of claim 6, wherein the determining that the connection is to be deleted comprises determining that the connection is to be deleted based on a failure or an event from a network element.

10. A network management server device, comprising:
a memory storing instructions; and
a processor, communicatively coupled to the memory, that facilitates execution of the instructions to perform operations, comprising:

receiving first instructions to establish a first service endpoint associated with a first type of service, receiving second instructions to establish a second service endpoint associated with a second type of service, receiving third instructions to establish a connection between the first service endpoint and the second service endpoint, and sending the first instruction, the second instruction, and the third instruction to one or more network element devices associated with the connection and establishing the connection between the first service endpoint and the second service endpoint, wherein the establishing the connection comprises:

in response to determining that the first service endpoint and the second service endpoint exist on a same network element device of the one or more network element devices:

creating a first row in a cross-connect data structure associated with the same network element device, in response to determining that the creating the first row is successful, creating two second rows to a service endpoint data structure associated with the network management server device and a third row to a connection data structure associated with the network management server device, and in response to determining that the creating the first row is not successful, generating a first failure notification;

in response to determining that the first service endpoint and the second service endpoint respectively reside on different network element devices of the one or more network element devices:

sending instructions to the different network element devices to create the first service endpoint and the second service endpoint, creating one or more fourth rows in service endpoint data structures respectively associated with a first network element device and a second network element device of the one or more network element devices, wherein the one or more fourth rows correspond to respective one or more cross-connections to one or more intermediate devices between the first network element device and the second network element device, creating one or more fifth rows in cross-connect data structures respectively associated with the first network element device and the second network element device, wherein the one or more fifth rows correspond to the respective one or more cross-connections, in response to determining that the creating the one or more fourth rows and the creating the one or more fifth rows is successful, creating a sixth row in the connection data structure associated with the network management server device, and in response to determining that the creating the one or more fourth rows and the creating the one or more fifth rows is not successful, generating a second failure notification.

11. The method of claim 6, wherein the third row comprises a first common index field containing a first object identifier indicating a first service endpoint type associated with the first service endpoint and a second common index field containing a second object identifier indicating a second service endpoint type associated with the second service endpoint, and wherein the first service endpoint type is different than the second service endpoint type.

12. The method of claim 11, wherein at least one of the first service endpoint type or the second service endpoint type comprises an asynchronous transfer mode (ATM) service, a Frame Relay service, or an Ethernet service.

13. A network management server device, comprising:
a memory storing instructions; and
a processor, communicatively coupled to the memory, that facilitates execution of the instructions to perform operations, comprising:
 determining that a connection is to be deleted;
 determining one or more network element devices associated with the connection;
 determining a first service endpoint and a second service endpoint associated with the connection, wherein the first service endpoint and the second service endpoint are associated, respectively, with a first service endpoint type and a second service endpoint type that is different than the first service endpoint type;
 deleting the connection in response to the determining that the connection is to be deleted, wherein the deleting comprises:
  in response to determining that the first service endpoint and the second service endpoint reside on a same network element device of the one or more network element devices:
   deleting a first row of a cross-connect data structure associated with the same network element device,
   in response to determining that the deleting is successful, deleting two second rows of a service endpoint data structure associated with the network management server device and a third row of a connection data associated with the network management server device, and
   in response to determining that the deleting is not successful, generating a first failure notification; and
  in response to determining that the first service endpoint and the second service endpoint respectively reside on different network element devices of the one or more network element devices,
   sending an instruction to a first network element device and a second network element device of the different network devices to delete the first service endpoint and the second service endpoint,
   deleting one or more fourth rows of service endpoint data structures respectively associated with the first network element device and the second network element device, wherein the one or more fourth rows correspond to respective one or more cross-connections to one or more intermediate devices between the first network element device and the second network element device,
   deleting one or more fifth rows of cross-connect data structures respectively associated with the first network element device and the second network element device, wherein the one or more fifth rows correspond to the respective one or more cross-connections,
   in response to determining that the deleting the one or more fourth rows and the deleting the one or more fifth rows is successful, deleting a sixth row of the connection data structure associated with the network management server device, and
   in response to determining that the deleting the one or more fourth rows and the deleting the one or more fifth rows is not successful, generating a second failure notification.

14. A non-transitory computer-readable medium having stored thereon computer executable instructions that, in response to execution, cause a system comprising a processor to perform operations, the operations comprising:
 receiving first instructions to create a first service endpoint of a first service endpoint type;
 receiving second instructions to create a second service endpoint of a second service endpoint type;
 receiving third instructions to create a connection between the first service endpoint and the second service endpoint;
 transferring the first instruction, the second, and the third instruction to one or more network element devices associated with the connection between the first service endpoint and the second service endpoint;
 in response to determining that the first service endpoint and the second service endpoint reside on a same network element device of the one or more network element devices:
  adding a first row in a cross-connect data structure associated with the same network element device,
  in response to determining that the adding is successful, adding two second rows in a service endpoint data structure associated with a network management server device and a third row in a connection data structure associated with the network management server device, and
  in response to determining that the adding is not successful, generating a first failure notification;
 in response to determining that the first service endpoint and the second service endpoint respectively reside on a first network element device and a second network element device of the one or more network element devices, wherein the first network element device and the second network element device are different:
  sending an instruction to the first network element device and the second network element device to create the first service endpoint and the second service endpoint, respectively,
  adding one or more fourth rows in service endpoint data structures respectively associated with the first network element device and the second network element device, wherein the one or more fourth rows correspond to respective one or more cross-connections to one or more intermediate devices between the first network element device and the second network element device,
  adding one or more fifth rows in cross-connect data structures respectively associated with the first network element device and the second network element device, wherein the one or more fifth rows correspond to the respective one or more cross-connections,
  in response to determining that the adding the one or more fourth rows and the adding the one or more fifth rows is successful, adding a sixth row in the connection data structure associated with the network management server device, and in response to determining that the adding the one or more fourth rows and the adding the one or more fifth rows is not successful, generating a second failure notification.

15. A non-transitory computer-readable medium having stored thereon computer executable instructions that, in response to execution, cause a system comprising a processor to perform operations, the operations comprising:

determining that a connection is to be deleted;

determining a first service endpoint and a second service endpoint residing on one or more network elements associated with the connection, wherein the first service endpoint supports a first service endpoint type and the second service endpoint supports a second service endpoint type that is different than the first service endpoint type;

deleting the connection in response to the determining that the connection is to be deleted, wherein the deleting the connection comprises:

in response to determining that the first service endpoint and the second service endpoint reside on a same network element device of the one or more network element devices:

removing a first row of a cross-connect data structure associated with the same network element device, in response to determining that the removing the first row is successful, removing two second rows of a service endpoint data structure associated with a network management server device and a third row of a connection data associated with the network management server device, and in response to determining that the removing the first row is not successful, generating a first failure notification; and in response to determining that the first service endpoint and the second service endpoint respectively reside on a first network element device and a second network element device of the one or more network element devices, wherein the first network element device and the second network element device are different, sending an instruction to the first network element device and the second network element device to delete the first service endpoint and the second service endpoint, respectively, removing one or more fourth rows of service endpoint data structures respectively associated with the first network element device and the second network element device, wherein the one or more fourth rows correspond to respective one or more cross-connections to one or more intermediate devices between the first network element device and the second network element device, removing one or more fifth rows of cross-connect data structures respectively associated with the first network element device and the second network element device, wherein the one or more fifth rows correspond to the respective one or more cross-connections, in response to determining that the removing the one or more fourth rows and the removing the one or more fifth rows is successful, removing a sixth row of the connection data structure associated with the network management server device, and in response to determining that the removing the one or more fourth rows and the removing the one or more fifth rows is not successful, generating a second failure notification.

\* \* \* \* \*